Oct. 11, 1932.　　　　C. H. SEAHOLM　　　　1,882,303
TALKING MOTION PICTURE APPARATUS
Original Filed Nov. 8, 1929
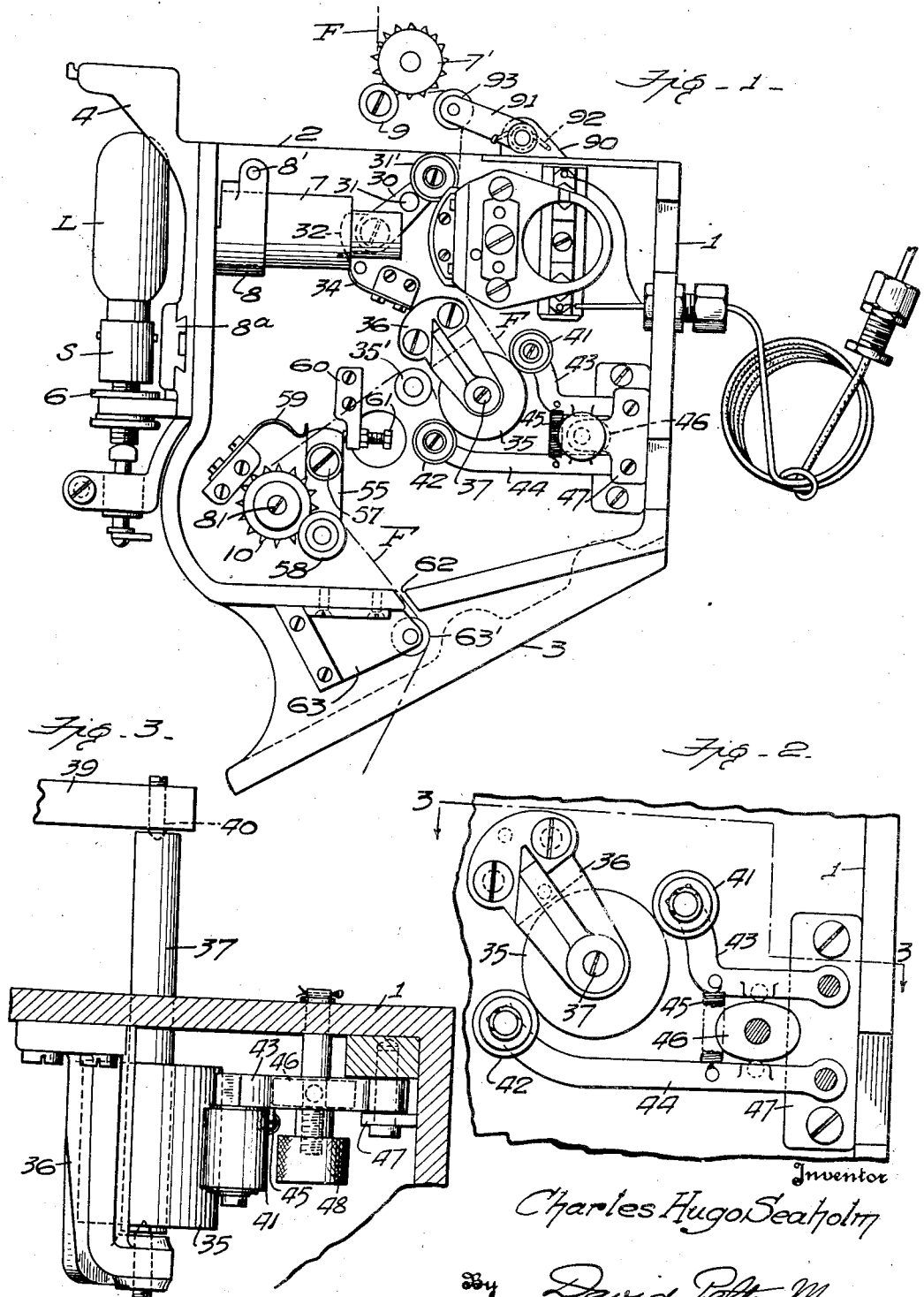

Patented Oct. 11, 1932

1,882,303

UNITED STATES PATENT OFFICE

CHARLES HUGO SEAHOLM, OF NEW YORK, N. Y., ASSIGNOR TO GENERAL TALKING PICTURES CORPORATION, OF NEW YORK, N. Y., A CORPORATION OF DELAWARE

TALKING MOTION PICTURE APPARATUS

Original application filed November 8, 1929, Serial No. 405,743. Divided and this application filed November 18, 1930. Serial No. 496,511.

The present invention relates to improvements in talking motion picture apparatus, this particular application being a division of the one filed November 8th, 1929. Serial No. 405,743.

One object of the invention is the provision of a novel means for resiliently holding the film in place upon a film guiding roller.

Another object of this invention is the provision of a sound-on-film head in which a roller for guiding the film is provided and in turn is rotated by the film, there being provided two rollers normally tensioned to hold the film upon the said roller combined with manually operative means for releasing the rollers during the threading operation or the removal of the film from the sound head.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the invention.

In the accompanying drawing:—

Figure 1 is a side elevational view of the sound-on-film head with the lid removed to exhibit the interior thereof.

Figure 2 is an enlarged detailed view of the film guiding roller with the holding rollers in contact therewith.

Figure 3 is a section taken on line 3—3 of Figure 2.

In the present practical embodiment of combined picture and sound projecting machines it is usual to maintain the picture projector and talking motion picture attachment, or what is known as the sound box, as two separate units mechanically connected together, the sound box unit being preferably located below the gear and lens box of the former. Naturally in such a device there are numerous sprocket wheels and rollers over which the film F passes and hence in threading up the machine it is necessary to make provision in the apparatus to permit of ease and rapidity in threading the machine without danger to the film. It is also desirable to provide a talking motion picture attachment for standard projection machines since in most cases the projection machine is already in operation and it is, therefore, highly desirable to be able to add as a unit the talking motion picture or sound box attachment. In this invention this object has been met in a highly successful manner with a rugged and relatively simple arrangement of parts.

A more detailed description of the invention with reference to the drawing will provide a better understanding of the invention. The casing supporting all of the parts of the attachment is shown at 1, and such casing is so shaped and designed as to rest upon and be attached to the base of the motion picture projector and have attached thereto and support the head of such projector. The upper edge indicated at 2 of this casing is made in such form or configuration so as to permit of the uniting of the attachment casing with the head of the picture projector. The edge indicated by the reference numeral 3 is of such configuration as to permit of attachment thereto of the base and lower reel magazine which receives the film indicated by the dotted line F.

At 4 is a small casing secured to the casing 1 in which the two exciter lamps L are mounted in their sockets S. Each socket is controlled by means of the threaded rod or sleeve and nut 6 to permit of its fine adjustment vertically. By the use of the two sockets S mounted as indicated, the operator without any interruption to service can move slide 8a to move one lamp L out of alignment with the optical system 7, and bring the other into alignment, this being necessary when one lamp burns out. The burned out lamp can thus be removed and a new one substituted, all of this being possible while the machine is being operated. Forming part of or secured to the casing 4 is a round cylindrical projection 8 which is slotted and provided with ears and a screw 8 so that optical system tube 7 may be adjustably secured therein. The lens system of any of the wellknown types in this art are supported within the tube 7 and are adjustable or fixed with respect to each other as may be desirable to permit of focusing the light from one of the exciter lamps on the film at the point where the sound record is impressed.

There has been indicated in Fig. 1 a toothed sprocket wheel 7' around a portion of which the film F passes and against which it is held by means of a small roller 9. This sprocket 7' represents the lower feed sprocket of the head of the picture projector. A similar sprocket is shown within the casing 1 at 10 and is mounted on a shaft 81 (See Fig. 1). Shaft 81 is connected with the shaft on which roller 7' is mounted by means of a plurality of gears of such size that the sprockets 7' and 10 are driven in the desired direction and at the same speed. These gears are preferably driven by means of an electric motor, the gears and motor not being shown in the drawing.

After the film F leaves sprocket 7' it is looped slightly, as shown, and then passes down under rollers 31' which curves the film against the surface of the slit block, the detailed description of which will later appear. The rollers 31' are mounted and carried on a pivoted lever 30 which has a projection 32 against which a flat spring 34 presses and thus holds the rollers resiliently or under tension toward the slit block. A knurled handle 31 is provided to release the rollers when threading the machine. The film after it leaves the slit block passes substantially fully around the relatively large roller 35 which is freely mounted on a shaft 37 journalled in a bracket 36, and thence over the small fixedly mounted roller 35'. By means of two small rollers 41 and 42 mounted on the ends of two pivotally supported arms or levers 43 and 44, respectively, the rollers 41 and 42 are urged towards the rollers 35 by means of a spring 45 connected between the pivoted arms 43 and 44, said arms 43 and 44 are pivotally supported on a block 47, on the casing in such a manner that a rotatable cam 46 lies between them. The cam 46 is secured to a knurled knob 48 which is operated to open or permit the closing of the arms and to thereby move the rollers to and from the roller 35. It has been found in practise that the shaft which carries the sprocket 7' is not always, nor is it made of sufficiently hard steel to wear smoothly and therefore that this sprocket often causes the jerky movement in the film which cannot be taken up by fly wheels or the like, but which in practise can be eliminated by the idler 93 over which the film is directed before being engaged by the upper rollers 31'. This idler 93 is supported from a lug 90, a portion of the casing 2 to which is pivoted an arm 91 which is held normally upwardly under tension by means of the spring 92 so that a slight tension is imparted to the idler 93 so that the film is held taut and any unevenness that may be imparted to the film by the sprocket 7' is "ironed out" and the usual fly wheel can be dispensed with. This mechanism, together with the rollers 35 imparts to the film the smooth steady motion it requires, and without the employment of fly wheels or other inertia devices.

The film F then passes around the sprocket wheel 10 and moves a smooth roller 58 which holds the film against the sprocket wheel. The roller 58 is mounted on an arm 55 pivotally supported at 57, while a flat spring 59 holds the roller 58 towards sprocket 10. Mounted on a small bracket 60 is an adjustable thumb screw 61 which serves to limit the clockwise movement of the lever 55 under the action of a spring 59. The film F then passes through an opening 62 in the bottom of the casing over the idler 63' of a block 63 and thence to the lower reel in the lower film magazine.

It may be pointed out here in connection with Fig. 2 that the roller 35 is mounted on shaft 37 in an anti-friction manner. The inner end of shaft 37 is journaled in a bracket 39 by means of the sharpened bearing pin 40. As will be apparent, the only force which drives the roller 35, and the shaft 37, is that caused by the film held against the toothless roller 35 by means of the rollers 41 and 42.

It will be seen from the foregoing disclosure that there has been devised an exceedingly efficient device for carrying out necessary functions incident to the production of sounds from protographic records.

What I claim is:—

1. In a mechanism of the type described employing a motion picture film, the combination of a sprocket over which the film passes and by means of which the film is moved, said sprocket being adapted to be driven by an electric motor, a roller over which the film passes, a pair of spaced pivotally mounted arms having their free ends disposed at diametrically opposed points relative to the roller, a roller mounted in the free end of each arm for holding the film against the first roller, a spring connected to both arms for holding the arms toward each other, a cam journalled between said arms and a manually operated shaft carrying the cam, whereby the arms are simultaneously moved outwardly against the action of the spring to move the rollers, carried by the arms, away from the first roller.

2. In an arrangement for imparting smooth motion to a motion picture film having a sound record thereon, the combination comprising two sprockets adapted to be driven at the same speed by means of an electric motor, a roller rotatably supported and around which the film passes, the film when driven by said sprockets acting to rotate said roller two spaced arms pivoted with their free ends disposed in an embracing relation to said roller, a spring normally holding the arms toward each other, said first roller, and a manually operable cam disposed between the arms for actuating the last two rollers to move them from contact with the film and against the action of the spring.

In testimony whereof I affix my signature.

CHARLES HUGO SEAHOLM.